US011375283B2

(12) United States Patent
DeMerchant et al.

(10) Patent No.: US 11,375,283 B2
(45) Date of Patent: Jun. 28, 2022

(54) CONFIGURING SETTINGS OF A TELEVISION

(71) Applicant: Sony Corporation, Tokyo (JP)

(72) Inventors: Marvin DeMerchant, San Diego, CA (US); Hyehoon Yi, San Diego, CA (US); Max Wu, San Diego, CA (US); Jason Clement, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 11 days.

(21) Appl. No.: 16/175,572

(22) Filed: Oct. 30, 2018

(65) Prior Publication Data

US 2020/0137458 A1 Apr. 30, 2020

(51) Int. Cl.
H04N 21/485 (2011.01)
H04N 21/422 (2011.01)
H04N 21/431 (2011.01)

(52) U.S. Cl.
CPC ... *H04N 21/4852* (2013.01); *H04N 21/42203* (2013.01); *H04N 21/42204* (2013.01); *H04N 21/4316* (2013.01)

(58) Field of Classification Search
CPC ......... H04N 21/4852; H04N 21/42203; H04N 21/42204; H04N 21/4316
USPC ....................................................... 348/738
See application file for complete search history.

(56) References Cited

U.S. PATENT DOCUMENTS

| 6,324,695 | B1 | 11/2001 | Lee et al. |
| 6,950,645 | B1 | 9/2005 | Kammer et al. |
| 7,734,143 | B2 | 6/2010 | Mizuhashi et al. |
| 8,266,665 | B2 | 9/2012 | Beyabani et al. |
| 8,310,594 | B2* | 11/2012 | Kim ........................ H04N 21/47 348/739 |
| 9,424,471 | B2 | 8/2016 | Hill et al. |
| 2006/0075429 | A1 | 4/2006 | Istvan et al. |
| 2006/0244864 | A1 | 11/2006 | Hayashi |
| 2007/0058033 | A1* | 3/2007 | Tsai ..................... H04N 21/482 348/14.05 |

(Continued)

FOREIGN PATENT DOCUMENTS

| CN | 107404705 | 11/2017 |
| JP | 2002374474 | 12/2002 |

(Continued)

OTHER PUBLICATIONS

"LG TV Settings Guide: What to Enable, Disable and Tweak" by Brian Westover Sep. 26, 2017, 9:58 AM.

(Continued)

*Primary Examiner* — John W Miller
*Assistant Examiner* — Omer Khalid
(74) *Attorney, Agent, or Firm* — Trellis IP Law Group, PC

(57) ABSTRACT

Implementations generally relate to configuring settings of a television. In some implementations, a method includes receiving a signal at a television, where the signal is associated with a television program. The method further includes determining the television program. The method further includes determining a plurality of variations of television settings based on the television program. The method further includes displaying a plurality of windows on a display of the television. The method further includes displaying the television program in each window of the plurality of windows, where the television program is displayed in each window based on a different variation of the plurality of variations of the television settings.

19 Claims, 10 Drawing Sheets

(56) References Cited

U.S. PATENT DOCUMENTS

| | | |
|---|---|---|
| 2008/0043031 A1 | 2/2008 | Jagmag |
| 2009/0190778 A1* | 7/2009 | Delia .................. H03G 3/3005 |
| | | 381/104 |
| 2012/0124474 A1* | 5/2012 | Suh ........................ H04N 21/47 |
| | | 715/717 |
| 2013/0033643 A1* | 2/2013 | Kim .................... G06F 3/04895 |
| | | 348/E5.097 |
| 2014/0201122 A1* | 7/2014 | Park ........................ G06N 5/02 |
| | | 706/46 |
| 2016/0125733 A1 | 5/2016 | Sallas et al. |
| 2016/0139777 A1 | 5/2016 | Pinho et al. |
| 2017/0242714 A1 | 8/2017 | Chen et al. |
| 2018/0152759 A1* | 5/2018 | Miller .............. H04N 21/44226 |
| 2018/0242036 A1* | 8/2018 | Watanabe ........... G06F 3/04842 |

FOREIGN PATENT DOCUMENTS

| | | |
|---|---|---|
| JP | 2008193215 | 8/2008 |
| JP | 2011166314 | 8/2011 |

OTHER PUBLICATIONS

"Samsung opts for smarter smart TV experience Samsung has powered-up its Smart TV experience with a 'One Remote' control and an upgraded voice recognition feature that will allow consumers to use smart features more smartly, says its development team." By Cho Mu-Hyun | Mar. 21, 2017.

"Sky Q voice controls expanded, now you can change channels and more" Stuart Miles | Oct. 5, 2017.

\* cited by examiner

CONFIGURING SETTINGS OF A TELEVISION

BACKGROUND

Television settings are typically configured using a remote control device. A user typically navigates through a main menu and submenus displayed on the television screen, where the user can set various television settings at desired values. It can be tedious and time consuming to find particular settings to set. Conventional solutions do not provide adequate means for facilitating a user in configuring television settings.

SUMMARY

Implementations generally relate to configuring settings of a television. In some implementations, a system includes one or more processors, and includes logic encoded in one or more non-transitory computer-readable storage media for execution by the one or more processors. When executed, the logic is operable to perform operations including: receiving a signal at a television, where the signal is associated with a television program; determining the television program; determining a plurality of variations of television settings based on the television program; displaying a plurality of windows on a display of the television; and displaying the television program in each window of the plurality of windows, where the television program is displayed in each window based on a different variation of the plurality of variations of the television settings.

With further regard to the system, in some implementations, the logic when executed is further operable to perform operations including: accessing metadata associated with the television program; and determining the television program based at least in part on the metadata. In some implementations, the logic when executed is further operable to perform operations including enabling a user to select a set of television settings by selecting a window. In some implementations, the logic when executed is further operable to perform operations including: enabling a user to select a set of television settings by selecting a window by voice; and enabling the user to select and change one or more individual television settings by voice. In some implementations, the logic when executed is further operable to perform operations including: sending out one or more command signals; and receiving one or more responses, where the one or more responses are received from one or more media devices. In some implementations, the logic when executed is further operable to perform operations including: receiving an image of a media device; and determining an identity of the media device based at least in part on the image. In some implementations, the logic when executed is further operable to perform operations including: determining content on the display of the television; and configuring one or more television settings based at least in part on the content.

In some embodiments, a non-transitory computer-readable storage medium with program instructions thereon is provided. When executed by one or more processors, the instructions are operable to perform operations including: receiving a signal at a television, where the signal is associated with a television program; determining the television program; determining a plurality of variations of television settings based on the television program; displaying a plurality of windows on a display of the television; and displaying the television program in each window of the plurality of windows, where the television program is displayed in each window based on a different variation of the plurality of variations of the television settings.

With further regard to the computer-readable storage medium, in some implementations, the instructions when executed are further operable to perform operations including: accessing metadata associated with the television program; and determining the television program based at least in part on the metadata. In some implementations, the instructions when executed are further operable to perform operations including enabling a user to select a set of television settings by selecting a window. In some implementations, the instructions when executed are further operable to perform operations including: enabling a user to select a set of television settings by selecting a window by voice; and enabling the user to select and change one or more individual television settings by voice. In some implementations, the instructions when executed are further operable to perform operations including: sending out one or more command signals; and receiving one or more responses, where the one or more responses are received from one or more media devices. In some implementations, the instructions when executed are further operable to perform operations including: receiving an image of a media device; and determining an identity of the media device based at least in part on the image. In some implementations, the instructions when executed are further operable to perform operations including: determining content on the display of the television; and configuring one or more television settings based at least in part on the content.

In some implementations, a method includes receiving a signal at a television, where the signal is associated with a television program. The method further includes determining the television program. The method further includes determining a plurality of variations of television settings based on the television program. The method further includes displaying a plurality of windows on a display of the television. The method further includes displaying the television program in each window of the plurality of windows, where the television program is displayed in each window based on a different variation of the plurality of variations of the television settings.

With further regard to the method, in some implementations, the method further includes accessing metadata associated with the television program; and determining the television program based at least in part on the metadata. In some implementations, the method further includes enabling a user to select a set of television settings by selecting a window. In some implementations, the method further includes enabling a user to select a set of television settings by selecting a window by voice; and enabling the user to select and change one or more individual television settings by voice. In some implementations, the method further includes sending out one or more command signals; and receiving one or more responses, where the one or more responses are received from one or more media devices. In some implementations, the method further includes receiving an image of a media device; and determining an identity of the media device based at least in part on the image.

A further understanding of the nature and the advantages of particular implementations disclosed herein may be realized by reference of the remaining portions of the specification and the attached drawings.

DETAILED DESCRIPTION

Implementations described herein enable and facilitate the configuring of settings of a television. As described in more detail herein, in various implementations, a system receives a signal at a television, where the signal is associated with a television program, and then determines the television program. For example, the system may determine that the television program is a particular sporting event. The system then determines variations of television settings based on the television program. For example, in one variation, the brightness may be set at a higher brightness. In another variation, the screen format may be set to a wide screen format. The system then displays multiple windows on the display of the television. The system displays the television program in each window, where the television program is displayed in each window based on the different a variation of the television settings. The system allows the user to then select between different settings to get an optimal or preferred picture. Although implementations disclosed herein are described in the context of televisions, the implementations may also apply to other media devices.

Figure 1:
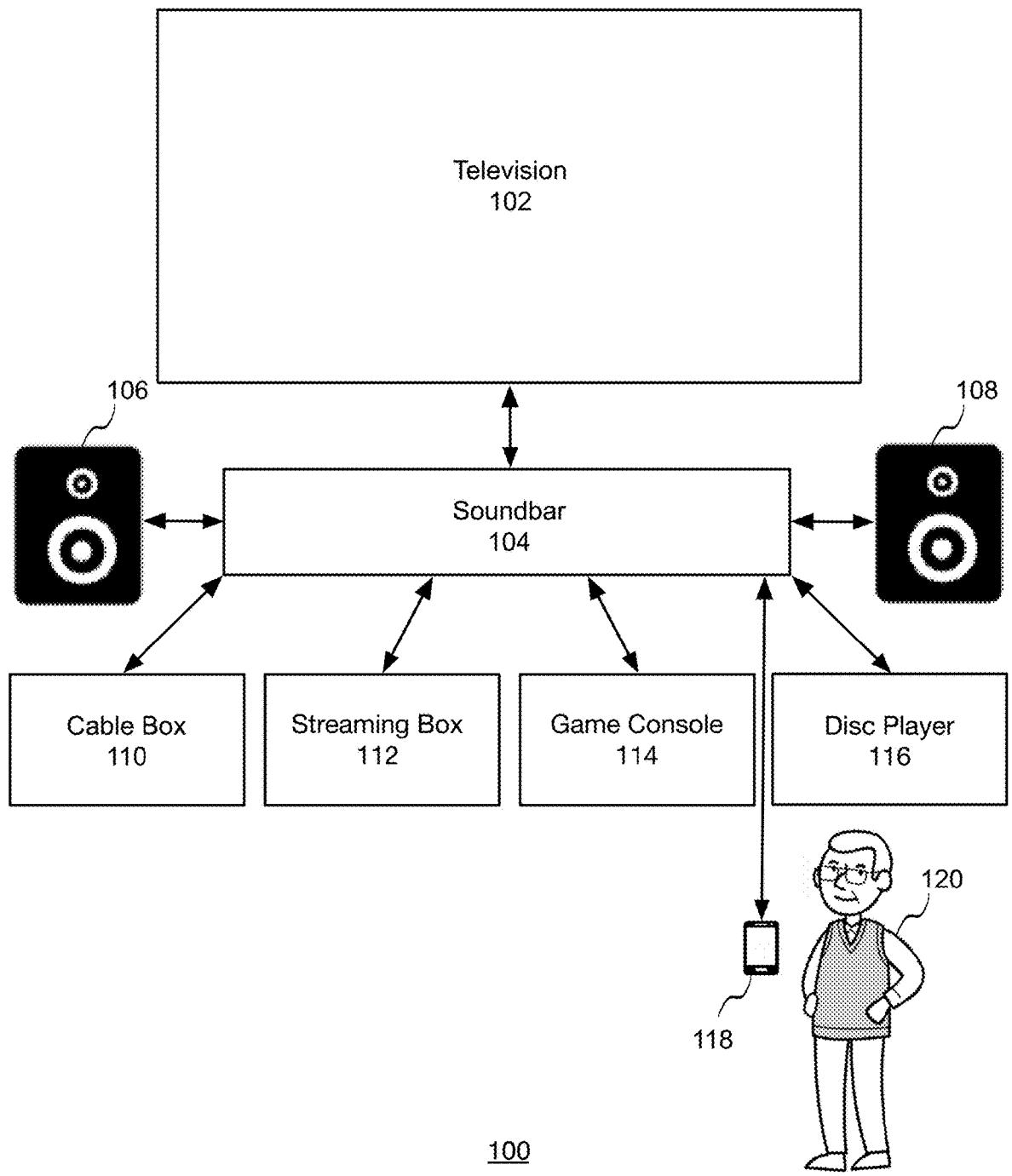
FIG. 1 illustrates a block diagram of an example media environment, which may be used for implementations described herein.

FIG. 1 illustrates a block diagram of an example media environment 100, which may be used for some implementations described herein. In some implementations, media environment 100 includes a television 102, a soundbar 104, speakers 106 and 108, a cable box 110, a streaming box 112, a game console 114, a disc player 116, and a remote control device 118. Also shown is a user 120.

In various implementations, a system that is integrated into television 102 facilitates the user in configuring the settings of television 102. In various implementations, television 102 may communicate with user 120 via a remote control device such as remote control device 118. In this particular example, remote control device 118 is a smart phone. In various implementations, the remote control device may be any remote control device such as one provided by the manufacture of television 102. As described in more detail herein, television 102 may also communicate with the user 120 by voice.

While some implementations are described herein in the context of the system residing in television 102, these implementations also apply to the system residing in other devices or located in other locations (e.g., in the cloud).

In other implementations, media environment 100 may not have all of the components shown and/or may have other elements including other types of elements instead of, or in addition to, those shown herein. In the various implementations described herein, a processor of television 102 may cause the elements described herein (e.g., settings, commands, messages, user preferences, etc.) to be displayed in a user interface on one or more display screens.

Figure 2:
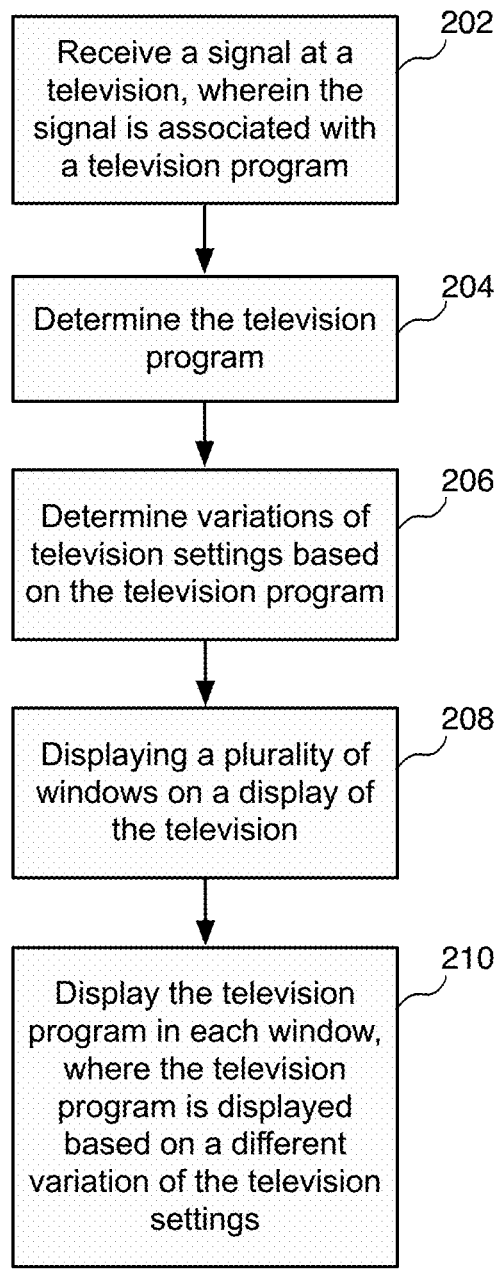
FIG. 2 illustrates an example flow diagram for configuring settings of a television, according to some implementations.

FIG. 2 illustrates an example flow diagram for configuring settings of a television, according to some implementations. As described in more detail herein, the system enables a user to quickly change television settings while watching television, including finding the best video and audio settings for the current content displayed on the television.

Referring to both FIGS. 1 and 2, a method is initiated at block 202, where the system receives a signal at television 102, where the signal is associated with a television program. The television program may be any content shown on television 102. For example, the television program may be a movie, a television show, a sporting event, as well as music content, etc. The source of the television program may vary, depending on the particular implementation. For example, the source may be a service in the cloud (e.g., remote database, etc.), a local storage (e.g., disk, hard drive, etc.).

At block 204, the system determines the television program. In some implementations, the system may determine the particular television program (e.g., Sport Team A versus Sport Team B, etc.). In some implementations, the system may determine the type of television program (e.g., sports, news, action movie, drama movie, etc.).

In various implementations, the system may access metadata associated with the television program. The metadata may be stored with the television program (e.g., on disk, etc.) or may be store in the cloud (e.g., remote database, remote service, etc.). The system then determines the television program based at least in part on the metadata. The metadata may include a title and a description of the television program, including type, genre, etc.

At block 206, the system determines variations of television settings based on the television program. In some implementations, the system may start with default television settings as one variation of the television settings. The system may then configure variations of the television settings. In various implementations, each variation has a unique set of television settings and varying values for each of the settings.

In an example implementation, the system may determine that the television program is a particular sporting channel. As such, one variation may have a higher brightness setting, higher contrast setting, higher volume setting, etc. that is associated with a particular television program or particular type of television program. Such a combination of settings may be predetermined and/or learned by the system. Another variation may have a higher brightness setting, default contrast setting, higher treble setting, lower bass setting, etc. Further example variations of television settings are described in more detail below.

In some implementations, the system may determine a preferred set of television settings previously configured. The system may then determine variations based on the preferred settings. For example, the system may determine that the user prefers a brighter setting (e.g., 70%) and higher volume (e.g., 35%). The system may use the preferred set of television settings in one variation of television settings, and determine other variations of that preferred set of television settings.

At block 208, the system displays windows on the display of television 102. The particular number of windows displayed may vary, depending on the particular implementation. For example, there may be 6 different windows on the television, as shown.

At block 210, the system displays the television program in each window. In various implementations, the television program is displayed in each window based on a different variation of the television settings. Example implementations are described in more detail below, in connection with FIG. 3, for example.

Figure 3:
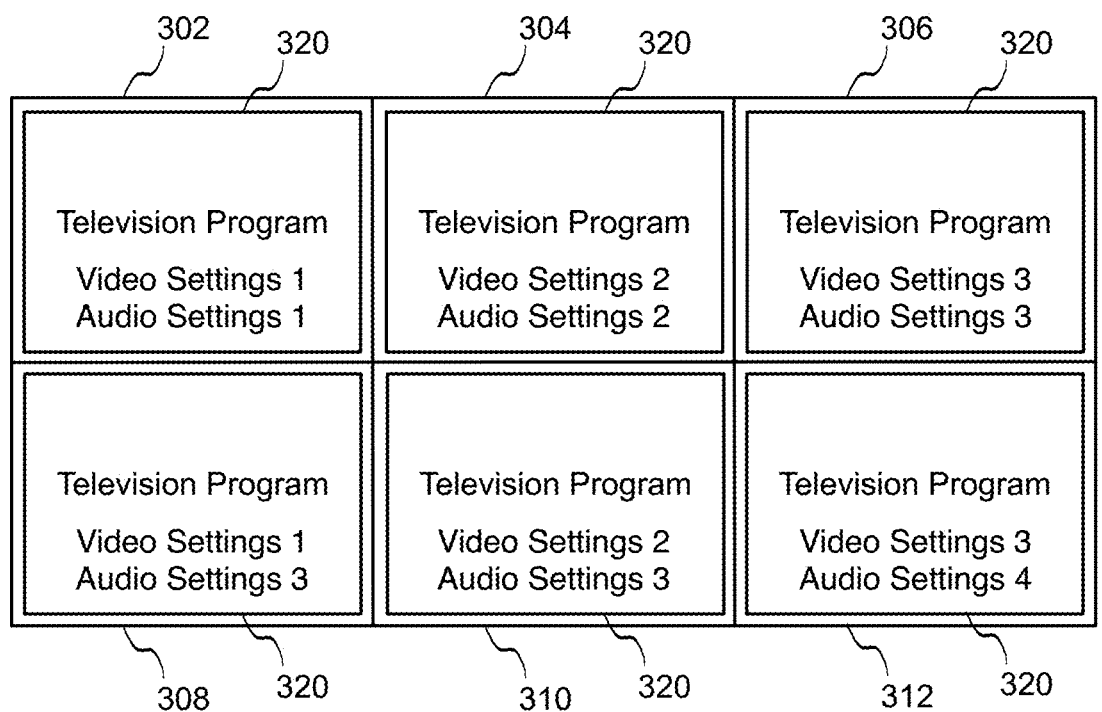
FIG. 3 illustrates an example television, where a television program is shown in each window based on a different variation of the television settings, according to some implementations.

FIG. 3 illustrates television 102, where the television program is shown in each window based on a different variation of the television settings, according to some implementations. As shown, television 102 is displaying multiple windows 302, 304, 306, 308, 310, and 312. A television program 320 is displayed in windows 302, 304, 306, 308, 310, and 312. In various implementations, television program 320 is the currently played television program.

In various implementations, each window displays television program 320 with a unique variation of television settings. For example, window 302 shows television program 320 with a particular combination of video settings (labeled Video Settings 1) and a particular combination of audio settings (labeled Audio Settings 1). For example, Video Settings 1 may be configured such that all video settings such as the brightness level are set at default contrast levels (e.g., 50%), and Audio Setting 1 may be configured such that all audio settings such as the volume level are set at a default volume level (e.g., 20%).

These television settings described are examples, and the particular types of television settings and the number of settings may vary, depending on the particular implementation. In some implementations, the system may display or cycle through video and audio settings displayed by name (e.g., brightness, volume, etc.) on the screen in order to allow the user to change the preselected television settings.

Window 304 shows television program 320 with a particular combination of video settings (labeled Video Settings 2) and a particular combination of audio settings (labeled Audio Settings 2). For example, Video Settings 2 may be configured such that the brightness level is set at a higher brightness level (e.g., 60%), and Audio Setting 2 may be configured such that the volume level is set at a higher volume level (e.g., 25%).

Window 306 shows television program 320 with a particular combination of video settings (labeled Video Settings 3) and a particular combination of audio settings (labeled Audio Settings 3). For example, Video Settings 3 may be configured such that the brightness level is set at a higher brightness level (e.g., 70%) and the contrast level set at a higher contrast level (e.g., 70%). Audio Setting 3 may be configured such that the volume level is set at a higher volume level (e.g., 30%).

In some implementations, the television settings may have different combinations of video and audio settings, depending on the particular implementation. For example, window 308 shows television program 320 with a particular combination of video settings (labeled Video Settings 1) and a particular combination of audio settings (labeled Audio Settings 3). For example, Video Settings 1 may be configured such that all video settings such as the brightness level are set at default levels (e.g., 50%), and Audio Setting 3 may be configured such that the volume level is set at a higher volume level (e.g., 30%).

Window 310 shows television program 320 with a particular combination of video settings (labeled Video Settings 2) and a particular combination of audio settings (labeled Audio Settings 3). For example, Video Settings 2 may be configured such that the brightness level is set at a higher brightness level (e.g., 60%), and Audio Setting 3 may be configured such that the volume level is set at a higher volume level (e.g., 30%).

Window 312 shows television program 320 with a particular combination of video settings (labeled Video Settings 3) and a particular combination of audio settings (labeled Audio Settings 4). For example, Video Settings 3 may be configured such that the brightness level is set at a higher brightness level (e.g., 60%) and the contrast level set at a higher contrast level (e.g., 70%). Audio Setting 4 may be configured such that the volume level is set at a higher volume level (e.g., 30%) and the treble setting is set at a treble level (60%).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

In various implementations, the system enables a user to select a set of television settings by selecting a window. The system enables the user to select a set of television settings by selecting a window using a remote control device, or by voice. The system also enables the user to select and change one or more individual television settings by voice. As a result, a user can conveniently and quickly select the best/preferred television settings for a particular television program without requiring extensive knowledge and testing for each type of video and audio setting.

In various implementations, the system continues to learn about the user's preferences based on the user's selections. The system catalogs the selected settings for future use by the user, as well as for other users viewing similar content.

Figure 4:
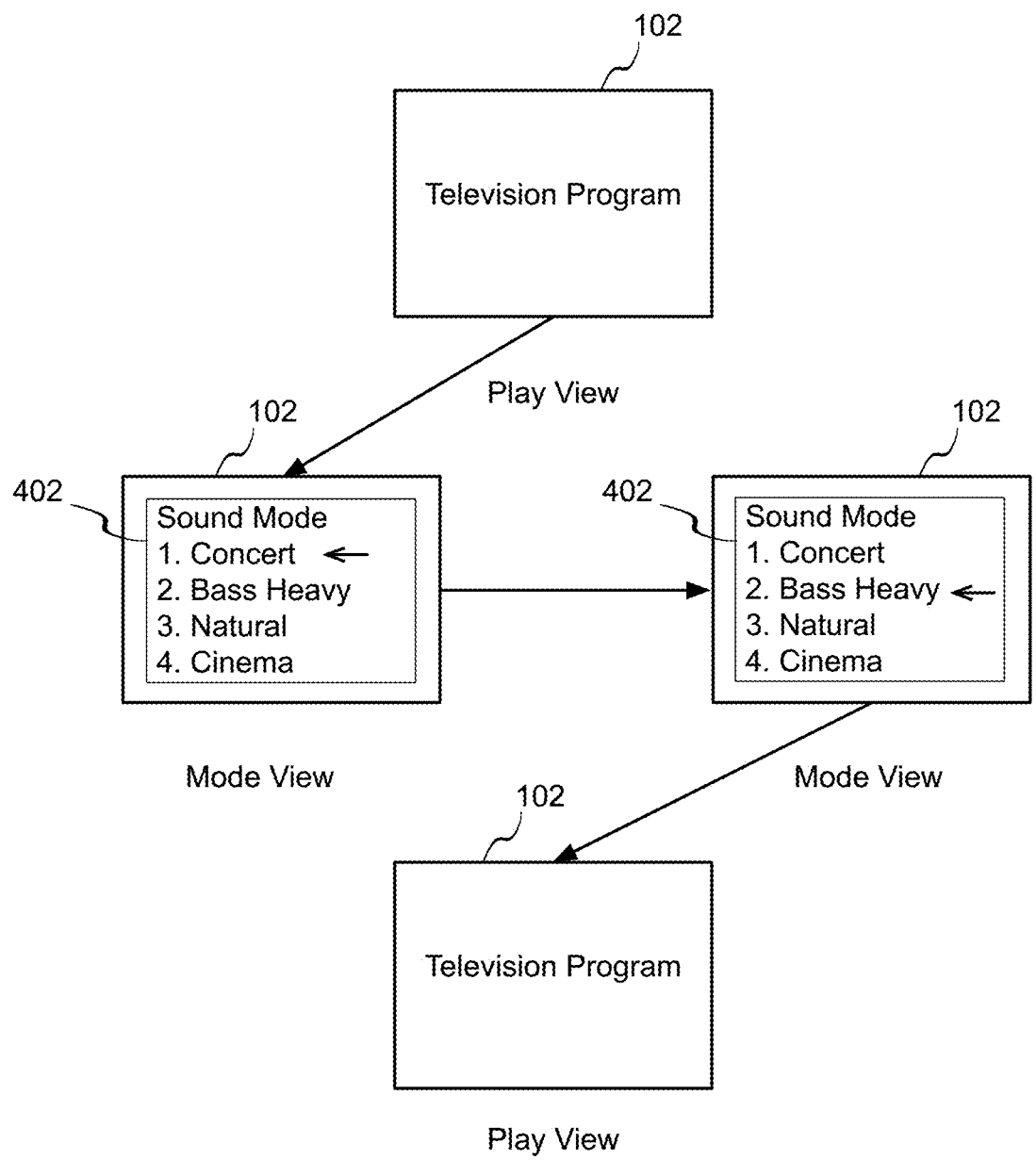
FIG. 4 illustrates an example flow diagram showing a television in different views, according to some implementations.

FIG. 4 illustrates an example flow diagram showing television 102 in different views, according to some implementations. As shown at the top and bottom, television 102 is in a play view, where television 102 is displaying a television program (e.g., movie, television show, music content, etc.). As shown, in the middle, television 102 is in a mode view, where sound modes are shown in a sound mode menu 402.

Figure 5:
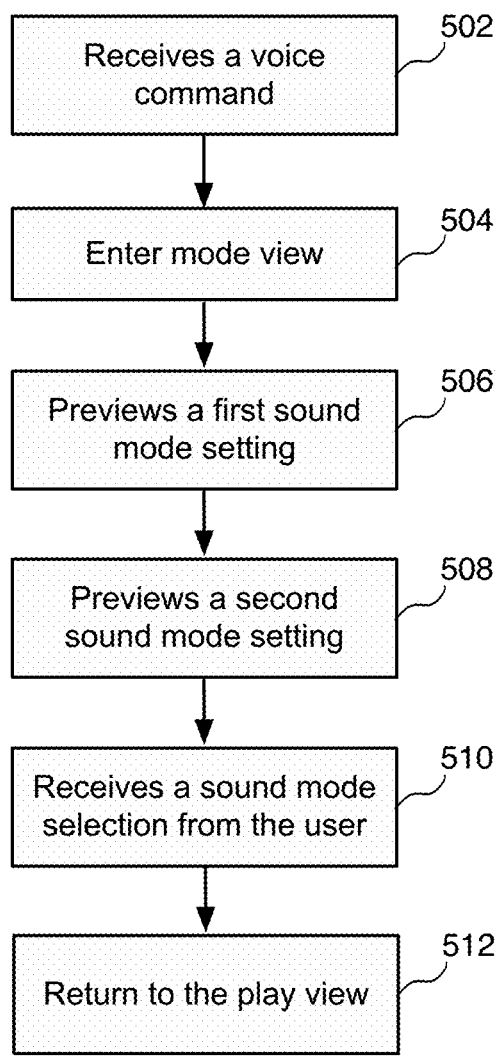
FIG. 5 illustrates an example flow diagram for changing television settings by voice, according to some implementations.

FIG. 5 illustrates an example flow diagram for changing television settings by voice, according to some implementations. The following example is described in the context of audio settings. These implementations and others may also apply to video settings. Referring to both FIGS. 4 and 5, a method is initiated at block 502, where the system receives a voice command (e.g., "Change sound mode," etc.) from a user.

At block 504, the system causes television 102 to enter a mode view, where the system displays sound mode menu 402, which lists preset options such as concert mode, bass heavy mode, natural mode, cinema mode, etc. These are examples, and the particular sound modes may vary, depending on the particular implementations. Other mode views are possible, such as visual modes, etc. In some implementations, the system continues to play the content (television program) in the background.

At block 506, the system previews the first sound mode setting (e.g., Concert) so that the user can hear the television program in that particular sound mode. The user interface also indicates the setting option that is being previewed (e.g., using an arrow as shown in FIG. 4, speaker icon, bolding, etc.).

At block 508, after a predetermined time period (e.g., 5 seconds, etc.), the system previews the second sound mode setting on the list (e.g., Bass Heavy) so that the user can hear the television program in that particular sound mode and compare it to the previous sound mode setting. The system changes the appropriate audio settings for the sound mode for the user to preview and compare. The user interface changes accordingly.

At block 510, the system receives a sound mode selection from the user. The system continues to cycle through optional sound modes until the user selects one. The system enables the user to select a particular sound mode by voice (e.g., "Set to cinema," "Set to number 1," etc.). The user may optionally make selections using touch or remote control devices.

At block 512, the system returns to the play view, where system them applies the appropriate audio settings to the television program being played and closes the menu, as shown in FIG. 4.

As a result, the user can conveniently change audio settings by voice. This is accomplished without the user having to navigate through complex menus (e.g., scrolling and selecting setting options from nested lists or grids of text. Navigating by voice can be difficult and awkward.

Figure 6:
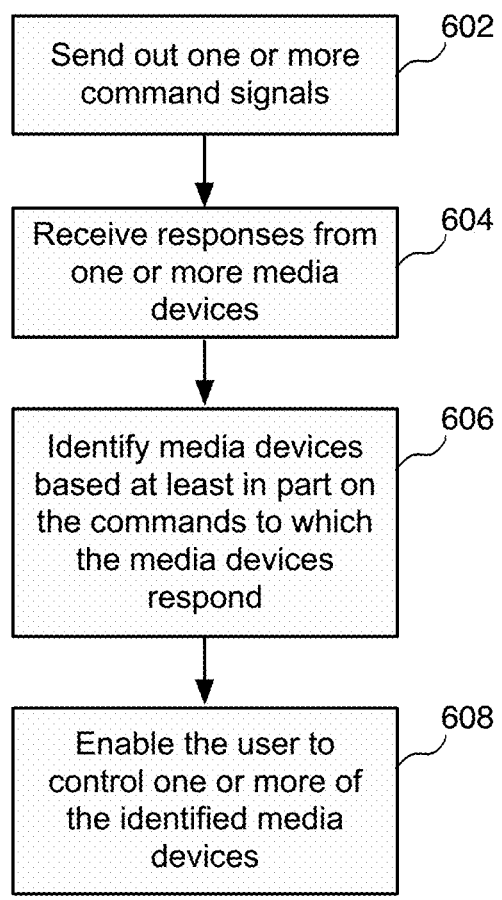
FIG. 6 illustrates an example flow diagram for discovering and identifying media devices by using a set of commands, according to some implementations.

FIG. 6 illustrates an example flow diagram for discovering and identifying media devices by using a set of commands, according to some implementations. In various embodiments, the system enables the user to control multiple media devices via the system. To control such media devices, the system first discovers and identifies available media devices. Referring to both FIGS. 1 and 6, a method is initiated at block 602, where the system sends out one or more command signals. Example command signals may include predefined commands such as power on, main menu, etc. In some implementations, the command signals may be infrared signals. The command signals may be transmitted via other means such as Bluetooth, Wi-Fi, etc.

At block 604, the system receives one or more responses from one or more media devices. Different media devices require particular control codes in order to operate particular functions. Media devices that use the same commands will respond. Those that require different commands will not respond.

At block 606, the system identifies one or more media devices based at least in part on the commands to which the media devices respond. In some embodiments, the system may determine a particular data structure or tree structure in which codes for a particular model are organized. For example, two media devices may respond to the same command signal to power on. However, one of the two media devices might respond to a command signal to access a menu, and the other media device might not respond. Based on the combination of commands responded to, the system may identify one or more of the media devices by comparing responses to make and models in a database. In various implementations, the system gathers information about the media by looking up databases with registered device information. With sufficient information, the system identifies the make and model of the media device. This enables the system to control an otherwise non-interoperable device.

At block 608, the system enables the user to control one or more of the identified media devices by a remote control device, or by voice. Because the system knows the make and model of a given media device, the system may determine all of the command codes, thereby enabling the user to control the media device.

Figure 7:
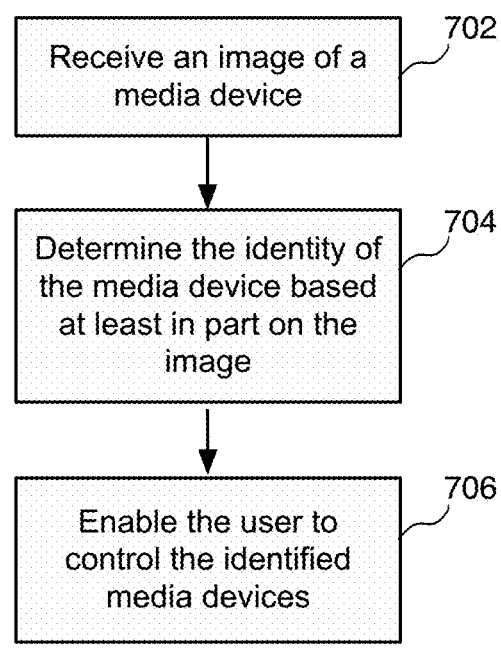
FIG. 7 illustrates an example flow diagram for identifying a media device, according to some implementations.

FIG. 7 illustrates an example flow diagram for identifying a media device, according to some implementations. Referring to both FIGS. 1 and 6, a method is initiated at block 702, where the system receives an image of a media device. In some embodiments, the system may receive the image after a user captures the image using a camera and sends or downloads the image to the system.

At block 704, the system determines the identity of the media device based at least in part on the image. In various implementations, the system may use suitable image recognition techniques to recognize various aspects of the media device. For example, the system may recognize and identify information such as a barcode, a model name, a model number, hardware controls, user interface, etc. If the identifying information is a barcode, the system may look up databases with registered device information. The layout of the hardware controls and/or user interface may also indicate the make and model using pattern recognition techniques. With sufficient information, the system identifies the make and model of the media device. This enables the system to control an otherwise non-interoperable device.

At block 706, the system enables the user to control the identified media devices by a remote control device, or by voice. Because the system knows the make and model of a given media device, the system may determine all of the command codes, thereby enabling the user to control the media device.

Figure 8:
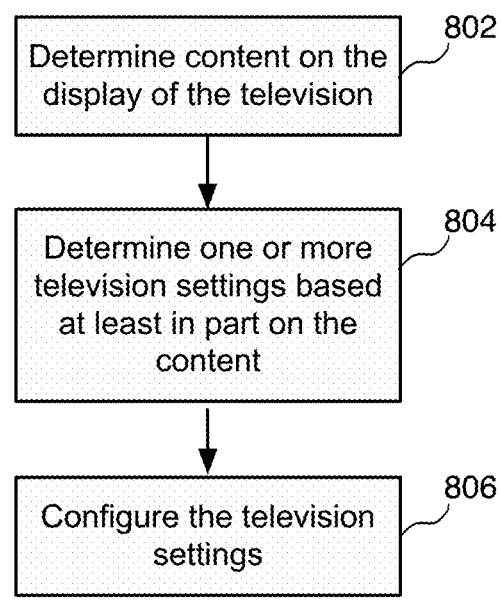
FIG. 8 illustrates an example flow diagram for configuring television settings, according to some implementations.

FIG. 8 illustrates an example flow diagram for configuring television settings, according to some implementations. Referring to both FIGS. 1 and 8, a method is initiated at block 802, where the system determines content on the display of the television. In various embodiments, the system may analyze video and audio frames using image and voice recognition techniques for key actions and phrase markers and can determine the content genre (e.g., sports, cinema, games, photos, etc.). Key actions may include visual movement in the video frames. For example, movement may include a football player running down a football field. Phrase markers may include key words in the dialogue may include the word "team," or cheering, etc.

The system may also use digital signal processing (DSP) analysis, graphics processing unit (GPU) analysis, and other techniques to determine the content. The system may also perform analysis of audio streams and a known configuration of a speaker layout in order to improve audio optimization. The system may also look up metadata associated with the content to determine details on content.

At block 804, the system determines one or more television settings based at least in part on the content. For example, the system may store predetermined television settings for each type of television program (e.g., sports, cinema, games, photos, etc.).

At block 806, the system configures one or more television settings, where the television settings are based at least in part on the content. As a result, the television settings are adjusted based on the genre and type of content being viewed, which provides an optimized viewer experience.

Implementations described herein provide various benefits. For example, implementations facilitate a user in selecting the best/preferred video and audio settings for a television without requiring extensive knowledge and testing for each type of video and audio setting. Implementations may also extend beyond televisions to computers, tablets, phones, etc. where more and more content is being consumed.

Figure 9:
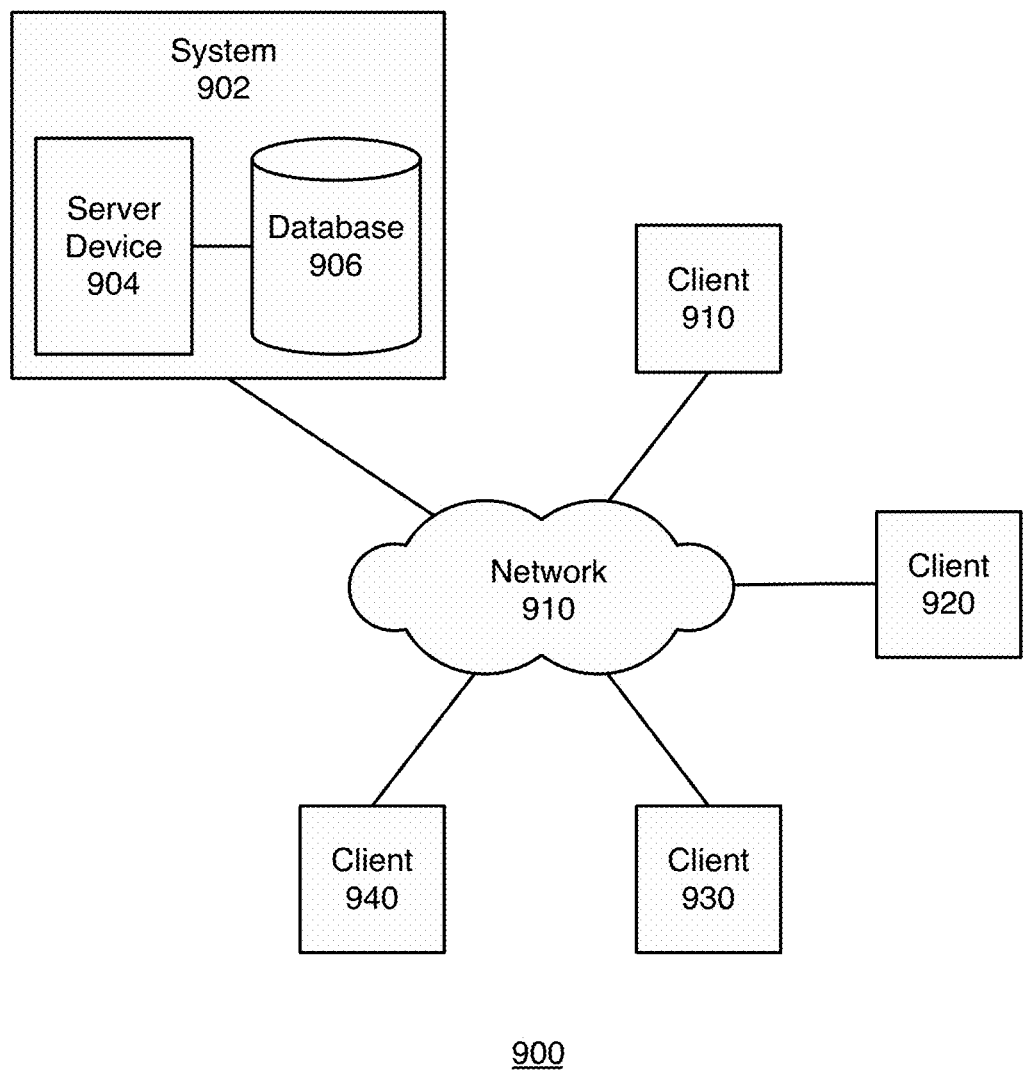
FIG. 9 illustrates a block diagram of an example network environment, which may be used for some implementations described herein.

FIG. 9 illustrates a block diagram of an example network environment 900, which may be used for some implementations described herein. In some implementations, network environment 900 includes a system 902, which includes a server device 904 and a database 906. System 902 may be implemented in television 102. Network environment 900 also includes client devices 910, 920, 930, and 940, which may communicate with each other directly or via system 902. Client devices 910, 920, 930, and 940 may represent media devices that communication with television 102. Network environment 900 also includes a network 950. Network 950 may be a Wi-Fi network, Bluetooth network, etc.

For ease of illustration, FIG. 9 shows one block for each of system 902, server device 904, and network database 906, and shows four blocks for client devices 910, 920, 930, and 940. Blocks 902, 904, and 906 may represent multiple systems, server devices, and databases. Also, there may be any number of client devices. In other implementations, network environment 900 may not have all of the components shown and/or may have other elements including other types of elements instead of, or in addition to, those shown herein.

In the various implementations described herein, a processor of system 902 and/or a processor of any client device 910, 920, 930, and 940 causes the elements described herein (e.g., information, etc.) to be displayed in a user interface on one or more display screens.

Implementations may apply to any network system and/or may apply locally for an individual user. For example, implementations described herein may be implemented by system 902 and/or any client device 910, 920, 930, and 940. System 902 may perform the implementations described herein on a stand-alone computer, tablet computer, smartphone, etc. System 902 and/or any of client devices 910, 920, 930, and 940 may perform implementations described herein individually or in combination with other devices.

Figure 10:
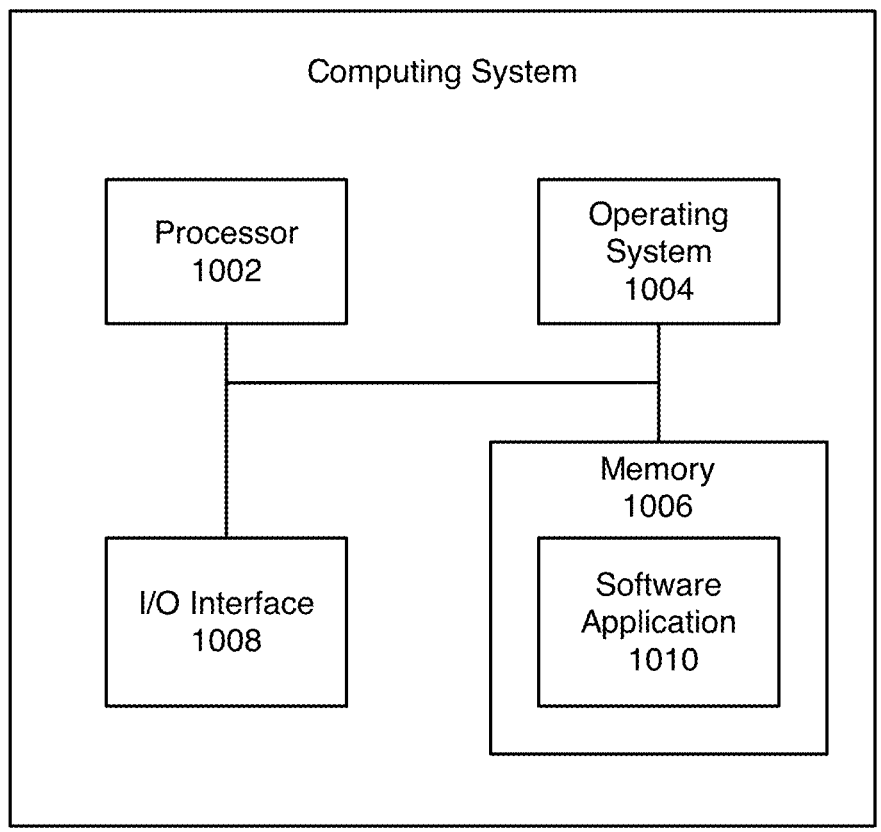
FIG. 10 illustrates a block diagram of an example computing system, which may be used for some implementations described herein.

FIG. 10 illustrates a block diagram of an example computing system 1000, which may be used for some implementations described herein. For example, computing system 1000 may be used to implement the system described herein, as well as to perform implementations described herein. In some implementations, computing system 1000 may include a processor 1002, an operating system 1004, a memory 1006, and an input/output (I/O) interface 1008. In various implementations, processor 1002 may be used to implement various functions and features described herein, as well as to perform the method implementations described herein. While processor 1002 is described as performing implementations described herein, any suitable component or combination of components of computing system 1000 or any suitable processor or processors associated with computing system 1000 or any suitable system may perform the steps described. Implementations described herein may be carried out on a user device, on a server, or a combination of both.

Computing system 1000 also includes a software application 1010, which may be stored on memory 1006 or on any other suitable storage location or computer-readable medium. Software application 1010 provides instructions that enable processor 1002 to perform the implementations described herein and other functions. Software application may also include an engine such as a network engine for performing various functions associated with one or more networks and network communications. The components of computing system 1000 may be implemented by one or more processors or any combination of hardware devices, as well as any combination of hardware, software, firmware, etc.

For ease of illustration, FIG. 10 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, computing system 1000 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to perform operations comprising:
receiving a signal at a television, wherein the signal is associated with a television program;
determining the television program;
determining a plurality of variations of television settings based on the television program;
displaying a plurality of windows on a display of the television;
displaying a variation of television settings from the plurality of variations of television settings in each window of the plurality of windows, wherein each variation of television settings is associated with a set of unique television setting values, and wherein the set of unique television setting values comprise video television setting values and audio television setting values, wherein each variation of television settings corresponds to a different mode of a plurality of modes;
presenting the television program in each window, wherein the television program is presented differently in each window based on a corresponding set of unique television setting values, and wherein the television program continues to play the television program in a background;
cycling through sound modes of the plurality of modes, wherein changes to the audio television setting values for each sound mode are applied for the user to preview and compare;
enabling a user to select a mode of the plurality of modes; and
presenting the television program based on a user selection of one of the modes.

2. The system of claim 1, wherein the logic when executed is further operable to perform operations comprising enabling the user to select a set of television settings by selecting a window.

3. The system of claim 1, wherein the logic when executed is further operable to perform operations comprising:
enabling the user to select a set of television settings by selecting a window by voice; and
enabling the user to select and change one or more individual television settings by voice.

4. The system of claim 1, wherein the logic when executed is further operable to perform operations comprising:
sending out one or more command signals; and
receiving one or more responses, wherein the one or more responses are received from one or more media devices.

5. The system of claim 1, wherein the logic when executed is further operable to perform operations comprising:
receiving an image of a media device; and
determining an identity of the media device based at least in part on the image.

6. The system of claim 1, wherein the logic when executed is further operable to perform operations comprising:
determining content on the display of the television; and
configuring one or more television settings based at least in part on the content.

7. A non-transitory computer-readable storage medium with program instructions stored thereon, the program instructions when executed by one or more processors are operable to perform operations comprising:
receiving a signal at a television, wherein the signal is associated with a television program;
determining the television program;
determining a plurality of variations of television settings based on the television program;
displaying a plurality of windows on a display of the television;
displaying a variation of television settings from the plurality of variations of television settings in each window of the plurality of windows, wherein each variation of television settings is associated with a set of unique television setting values, and wherein the set of unique television setting values comprise video television setting values and audio television setting values, wherein each variation of television settings corresponds to a different mode of a plurality of modes;

presenting the television program in each window, wherein the television program is presented differently in each window based on a corresponding set of unique television setting values, and wherein the television program continues to play the television program in a background;

cycling through sound modes of the plurality of modes, wherein changes to the audio television setting values for each sound mode are applied for the user to preview and compare;

enabling a user to select a mode of the plurality of modes; and presenting the television program based on a user selection of one of the modes.

8. The computer-readable storage medium of claim 7, wherein the instructions when executed are further operable to perform operations comprising:

accessing metadata associated with the television program; and determining the television program based at least in part on the metadata.

9. The computer-readable storage medium of claim 7, wherein the instructions when executed are further operable to perform operations comprising enabling the user to select a set of television settings by selecting a window.

10. The computer-readable storage medium of claim 7, wherein the instructions when executed are further operable to perform operations comprising:

enabling the user to select a set of television settings by selecting a window by voice; and enabling the user to select and change one or more individual television settings by voice.

11. The computer-readable storage medium of claim 7, wherein the instructions when executed are further operable to perform operations comprising:

sending out one or more command signals; and receiving one or more responses, wherein the one or more responses are received from one or more media devices.

12. The computer-readable storage medium of claim 7, wherein the instructions when executed are further operable to perform operations comprising:

receiving an image of a media device; and determining an identity of the media device based at least in part on the image.

13. The computer-readable storage medium of claim 7, wherein the instructions when executed are further operable to perform operations comprising:

determining content on the display of the television; and configuring one or more television settings based at least in part on the content.

14. A computer-implemented method comprising:

receiving a signal at a television, wherein the signal is associated with a television program;

determining the television program;

determining a plurality of variations of television settings based on the television program;

displaying a plurality of windows on a display of the television;

displaying a variation of television settings from the plurality of variations of television settings in each window of the plurality of windows, wherein each variation of television settings is associated with a set of unique television setting values, and wherein the set of unique television setting values comprise video television setting values and audio television setting values, wherein each variation of television settings corresponds to a different mode of a plurality of modes;

presenting the television program in each window, wherein the television program is presented differently in each window based on a corresponding set of unique television setting values, and wherein the television program continues to play the television program in a background;

cycling through sound modes of the plurality of modes, wherein changes to the audio television setting values for each sound mode are applied for the user to preview and compare;

enabling a user to select a mode of the plurality of modes; and presenting the television program based on a user selection of one of the modes.

15. The method of claim 14, further comprising:

accessing metadata associated with the television program; and determining the television program based at least in part on the metadata.

16. The method of claim 14, further comprising enabling the user to select a set of television settings by selecting a window.

17. The method of claim 14, further comprising:

enabling the user to select a set of television settings by selecting a window by voice; and enabling the user to select and change one or more individual television settings by voice.

18. The method of claim 14, further comprising:

sending out one or more command signals; and receiving one or more responses, wherein the one or more responses are received from one or more media devices.

19. The method of claim 14, further comprising:

receiving an image of a media device; and determining an identity of the media device based at least in part on the image.

* * * * *